(12) United States Patent
Puccetti et al.

(10) Patent No.: US 7,745,953 B2
(45) Date of Patent: Jun. 29, 2010

(54) ENERGY STORAGE SYSTEM FOR POWERING VEHICLE ELECTRIC USER DEVICES

(75) Inventors: Angelo Puccetti, Bracciano (IT); Michele Pennese, Medicina (IT)

(73) Assignees: Magneti Marelli Powertrain S.p.A., Corbetta (IT); Ente per Le Nuove Tecnologie, L'Energia E L'Anbiente-ENEA, Rome (IT)

( * ) Notice: Subject to any disclaimer, the term of this patent is extended or adjusted under 35 U.S.C. 154(b) by 487 days.

(21) Appl. No.: 11/380,043

(22) Filed: Apr. 25, 2006

(65) Prior Publication Data

US 2007/0001616 A1    Jan. 4, 2007

(30) Foreign Application Priority Data

May 2, 2005    (IT)    .................. RM20050055 U

(51) Int. Cl.
    *B60L 1/00*    (2006.01)
(52) U.S. Cl. ..................... 307/10.1; 320/104
(58) Field of Classification Search ............. 363/21.01, 363/98; 323/282; 307/10.1; 320/104
    See application file for complete search history.

(56) References Cited

U.S. PATENT DOCUMENTS

| | | | |
|---|---|---|---|
| 5,256,956 A | 10/1993 | Tsuchiya et al. | |
| 5,705,902 A * | 1/1998 | Merritt et al. | 318/400.42 |
| 5,939,835 A * | 8/1999 | Takeda et al. | 315/209 R |
| 6,202,615 B1 | 3/2001 | Pels et al. | |
| 6,340,877 B1 * | 1/2002 | Mita et al. | 320/112 |
| 2001/0048295 A1 * | 12/2001 | Joch | 323/282 |
| 2003/0002300 A1 * | 1/2003 | Nakamura | 363/21.01 |
| 2004/0062059 A1 * | 4/2004 | Cheng et al. | 363/17 |
| 2005/0003710 A1 | 1/2005 | Congdon et al. | |

OTHER PUBLICATIONS

Loree, D.L. et al., Design optimization of L-C filters, Jun. 26, 2000, IEEE, Power Modulator Symposium, 2000. Conferece Record of the 2000 Twenty-Fourth International, pp. 137-140.*
Johnson, David et al., Basic Electric Circuit Analysis, 1995, Prentice-Hall, Inc., fifth edition, pp. 148-150.*
R. Bonert et al., "Super-Capacitors for Peak Load Shaving of Batteries", EPE '97. 7th European Conference on Power Electronics and Applications, Sep. 8-10, 1997.

* cited by examiner

*Primary Examiner*—Albert W Paladini
*Assistant Examiner*—Daniel Cavallari
(74) *Attorney, Agent, or Firm*—Baker & Daniels LLP

(57) ABSTRACT

An energy storage system for powering electric user devices of a vehicle, the energy storage system having a battery; a capacitive element connected parallel to the terminals of the battery; and an inductive element connected in series to the battery, between the battery and the capacitive element; to effectively regulate power/energy flow between the battery and the capacitive element during transients, the ratio between the capacity of the battery measured in (Ah) and the capacitance of the capacitive element measured in (F) is less than 1, and the ratio between the capacity of the battery measured in (Ah) and the inductance of the inductive element measured in (μH) is less than 1.

13 Claims, 7 Drawing Sheets

ENERGY STORAGE SYSTEM FOR POWERING VEHICLE ELECTRIC USER DEVICES

The present invention relates to an energy storage system for powering vehicle electric user devices.

The present invention may be used to advantage in the car industry, to which the following description refers purely by way of example.

BACKGROUND OF THE INVENTION

The need for more effective technologic solutions to the problems posed by both private and public passenger transport is now generally acknowledged. In particular, attention is increasingly focused on achieving a substantial reduction in consumption and a real reduction in pollutant and acoustic emissions, especially in urban areas. Both these problems are of universal concern, and there is not a car industry that is not currently engaged in researching and developing vehicles capable of providing at least partial solutions and reducing the effect these problems have on human living conditions.

This explains the increasingly widespread use of innovative vehicles equipped with highly efficient, low-pollution propulsion systems. Particularly interesting in this respect is the development of so-called "hybrid" vehicles known as HEVs (Hybrid Electric Vehicles). These are vehicles of various design integrating an electric generating system, a reversible storage system, and a drive system comprising an electric motor and a combustion engine, and are in turn classified, according to the degree of hybridization, as: "Mild HEV", "Medium HEV" and "Full HEV".

At present, the most commonly used vehicles are those in the minimum-hybrid or "Mild HEV" or "Mild Hybrid Electric Vehicle" class. In this case, to a vehicle of conventional design is added the possibility of employing an electric drive over very short distances or in particular short-term situations. It is important to note that even a minimum degree of hybridization has advantages in terms of reducing consumption and pollutant emissions, especially when driving in urban areas.

A conventional vehicle is equipped with one 12 volt lead-acid battery capable of supplying average power of 400-800 watts and peak power of 1500-3500 watts (only required when starting the engine). A "Mild HEV" vehicle, on the other hand, is equipped with a battery (or group of batteries) capable of supplying average power of 2500-3500 watts and peak power of 8000-11000 watts (only required when starting the engine).

In "Stop and Start" mode, the internal combustion engine is turned off when the vehicle is stationary or coming to a stop (typically for reasons of traffic, such as a red light or a giveway junction), and is started again when the driver presses the accelerator. During start-up, the electric starter motor consumes a considerable amount of electrical energy, thus greatly stressing and reducing the electric charge of the vehicle battery. In "Stop and Start" mode, therefore, intensive use is made of the vehicle battery, on account of the high frequency with which the internal combustion engine is started, particularly when driving in city traffic.

Regenerating mode also increases stress of the vehicle battery, on account of the battery having to absorb a large amount of electrical energy over a short period of time. In regenerating mode, deceleration of the vehicle is used to generate electrical energy, which is stored in the vehicle battery, thus recovering at least part of the kinetic energy which would otherwise be dissipated in the form of heat by a conventional brake system.

In a vehicle battery, controlling power and energy flow during sharp-discharge transients when starting up the internal combustion engine is a delicate business, particularly when the battery is called upon to power other electric devices at the same time. In fact, the reduction in the capacity of the battery caused by simultaneously-operating electric devices may seriously impair start-up of the internal combustion engine, on account of the high transient power required at this stage.

To tackle these problems, various solutions have been proposed, all mainly based on energy storage systems comprising a combination of batteries and banks of ultracapacitors. In known energy storage systems of this sort, energy flow is controlled by predetermined control logic requiring the manufacture and use of specific electronic control circuits, thus complicating the system and increasing both production and routine maintenance cost.

SUMMARY OF THE INVENTION

It is an object of the present invention to provide an energy storage system, for powering vehicle electric user devices, designed to eliminate the aforementioned drawbacks, and which is cheap and easy to produce, and particularly effective in controlling power and/or energy flow during charge and discharge transients.

According to the present invention, there is provided an energy storage system for powering vehicle electric user devices, as claimed in the attached Claims.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
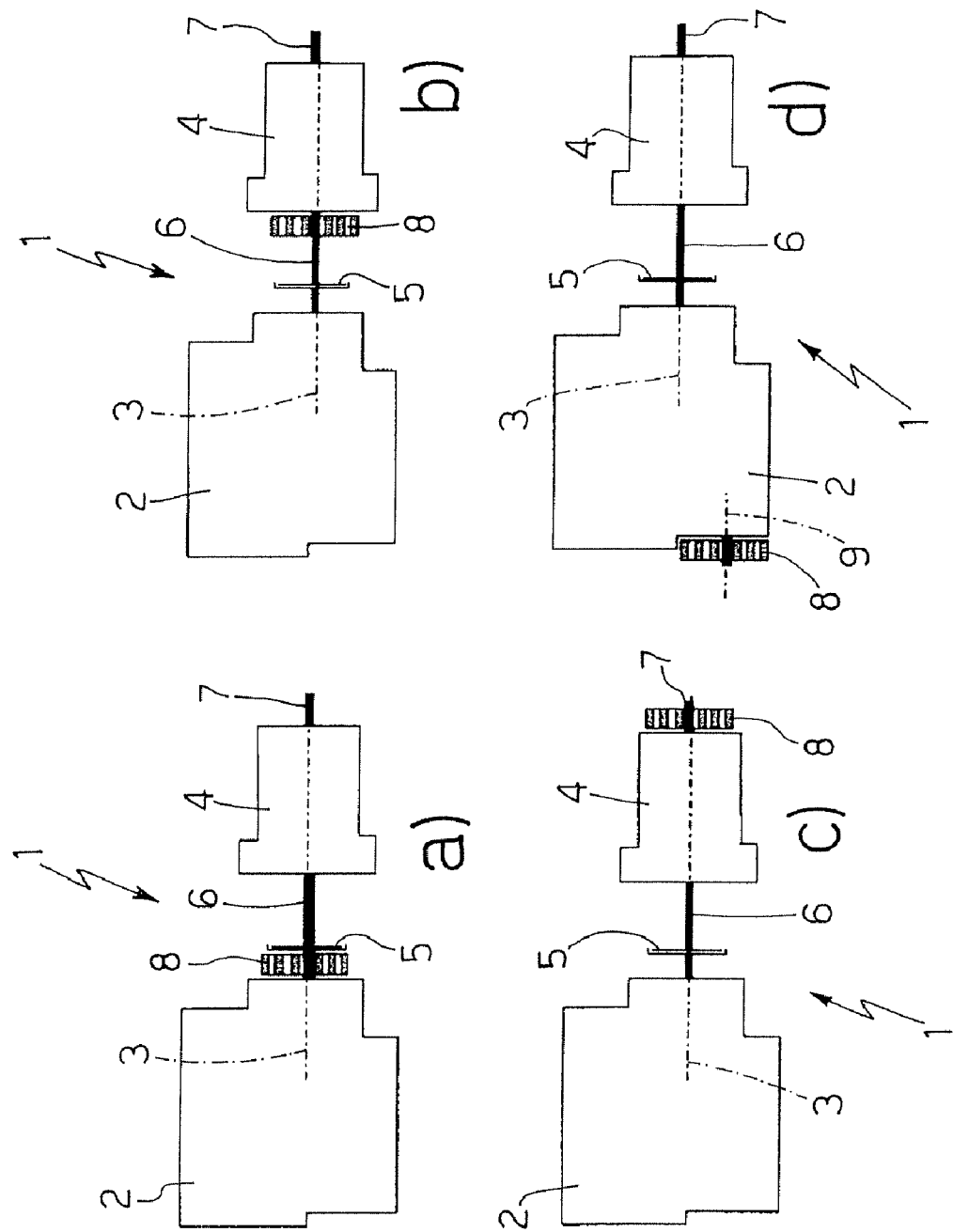
FIG. 1 shows four possible schemes for mechanically connecting an electric machine and an internal combustion engine in a power train of a hybrid vehicle.

Number 1 in FIG. 1 indicates as a whole a power train of a hybrid vehicle (not shown). Power train 1 comprises an internal combustion engine 2 having a drive shaft 3 connected to a transmission 4 with the interposition of a clutch 5; transmission 4 has an input shaft 6 connected mechanically to drive shaft 3 with the interposition of clutch 5, and an output shaft 7 connected mechanically to the drive wheels (not shown) of the hybrid vehicle; and power train 1 also comprises a reversible electric machine 8 which may operate as both an electric motor and an electric generator.

In different embodiments, reversible electric machine 8 is fitted to drive shaft 3 of internal combustion engine 2 upstream from clutch 5 (FIG. 1a), is fitted to input shaft 6 of transmission 4 downstream from clutch 5 (FIG. 1b), is fitted to output shaft 7 of transmission 4 (FIG. 1c), or is connected to a secondary shaft 9 angularly integral with drive shaft 3 of internal combustion engine 2 (FIG. 1d).

Figure 2:
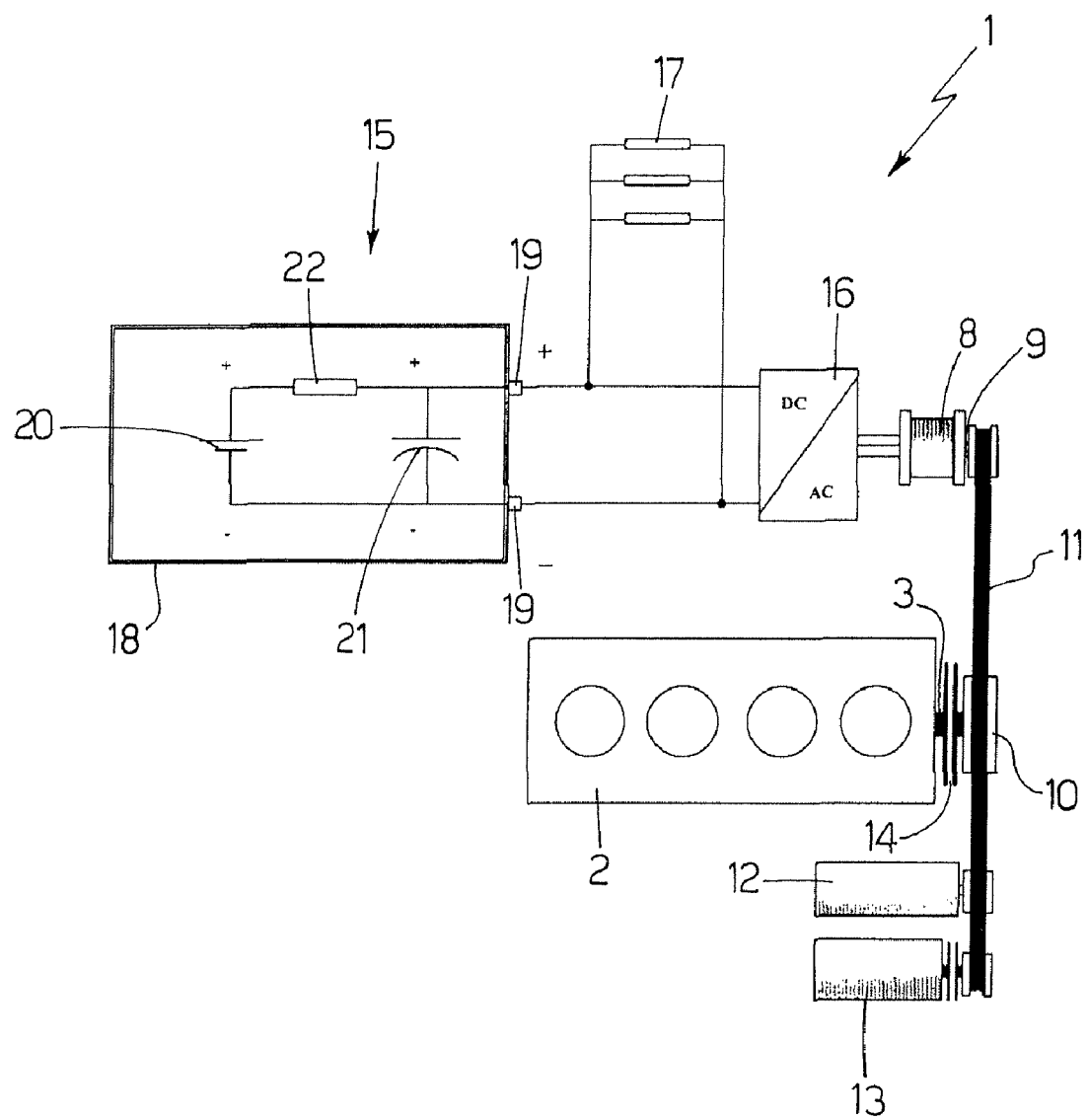
FIG. 2 shows, schematically, a power train of a hybrid vehicle equipped with an energy storage system in accordance with the present invention.

FIG. 2 shows an example of the FIG. 1d scheme, in which reversible electric machine 8 is connected to a secondary shaft 9 angularly integral with drive shaft 3 of internal combustion engine 2. More specifically, secondary shaft 9 is connected to drive shaft 3 of internal combustion engine 2 on the opposite side to clutch 5 and transmission 4, and is connected to a pulley 10 by a V-ribbed belt drive mechanism 11, which also transmits motion to auxiliary loads defined by a hydraulic power steering pump 12 and by an air conditioner compressor 13. Pulley 10 is preferably connected to drive shaft 3 of internal combustion engine 2 by an electromagnetic clutch 14.

Reversible electric machine 8 is an alternating-current machine, and is connected electrically to a direct-current energy storage system 15 via a two-way electronic converter 16 allowing reversible electric machine 8 to operate in generator mode and motor mode. A number of on-vehicle direct-current electric devices 17 (interior and exterior lighting, air conditioning, radio . . . ) are also connected to, and are powered directly by, energy storage system 15.

It is important to note that the FIG. 2 configuration of power train 1 permits operation of all the vehicle functions (power steering, air conditioner, electric devices) even when internal combustion engine 2 is turned off, by virtue of electromagnetic clutch 14. Power train 1 can therefore operate in "Stop and Start" mode, in which internal combustion engine 2 is turned off when the vehicle is stationary or coming to a stop (typically for reasons of traffic, such as a red light or a give-way junction), and is started again when the driver presses the accelerator.

Moreover, electronic converter 16 being two-way, power train 1 in FIG. 2 may operate in regenerating mode, in which deceleration of the vehicle is used to generate electrical energy, which is stored in energy storage system 15, thus recovering at least part of the kinetic energy which would otherwise be dissipated in the form of heat by a conventional brake system.

Energy storage system 15 comprises a casing 18 having two external terminals 19. To external terminals 19 are connected a battery 20 (e.g. a 12 volt lead-acid battery), a capacitive element 21 connected parallel to battery 20, and an inductive element 22 connected in series to the terminals of battery 20, between battery 20 and capacitive element 21.

As will be described in detail and demonstrated by test results, inductive element 22 provides, during transients, for differentially dividing power and energy flow between battery 20 and capacitive element 21, while respecting the complementary characteristics of these two sources.

To effectively regulate power/energy flow between battery 20 and capacitive element 21 during discharge transients (i.e. when battery 20 is supplying electrical energy) and charge transients (i.e. when battery 20 is absorbing electrical energy), the ratio between the capacity of battery 20 measured in Ampere-hours (Ah) and the capacitance of capacitive element 21 measured in Farads (F) is less than 1, and the ratio between the capacity of battery 20 measured in Ah and the inductance of inductive element 22 measured in microHenries (µH) is less than 1.

More specifically, optimum regulation of power/energy flow between battery 20 and capacitive element 21 during discharge and charge transients is achieved when the ratio between the capacity of battery 20 measured in Ah and the inductance of inductive element 22 measured in µH is below 0.5 and preferably below 0.25.

In a preferred embodiment, the capacitance of capacitive element 21 is first sized, and the inductance of inductive element 22 is then sized as a function of the capacitance of capacitive element 21. The capacitance of capacitive element 21 is typically so sized to enable capacitive element 21 to store enough energy to independently power the vehicle electric user devices (electric devices 17, and reversible electric machine 8 operating as a motor) during a predetermined initial time interval of a discharge transient.

Capacitive element 21 is sized to meet the following requirements:

the maximum current withstandable by capacitive element 21 is greater than the maximum current supply required of capacitive element 21 during the initial time interval of the discharge transient;

the maximum voltage withstandable by capacitive element 21 is greater than the maximum discharge voltage;

the energy that can be supplied by capacitive element 21 is greater than the energy required by the electric user devices during the initial time interval of the discharge transient;

the voltage at the terminals of capacitive element 21 at the end of the initial time interval of the discharge transient is greater than the minimum supply voltage of the electric user devices.

Capacitive element 21 is therefore sized according to the equation:

$$E_{TRANS} = \frac{1}{2} \cdot C \cdot (V_{NOM}^2 - V_{MIN}^2)$$

where:

$E_{TRANS}$ is the energy required by the electric user devices during the initial time interval of the discharge transient;

C is the total capacitance of capacitive element 21;

$V_{NOM}$ is the nominal voltage at the terminals of capacitive element 21;

$V_{MIN}$ is the minimum supply voltage of the electric user devices.

The capacitance of capacitive element 21 may also be sized to enable capacitive element 21 to absorb energy supplied by the vehicle electric user devices (i.e. by reversible electric machine 8 operating as a generator during regenerative braking) during a predetermined initial time interval of a charge transient.

In which case, capacitive element 21 is sized according to the equation:

$$E_{TRANS} = \frac{1}{2} \cdot C \cdot (V_{MAX}^2 - V_{NOM}^2)$$

where:

$E_{TRANS}$ is the energy supplied by the electric user devices during the initial time interval of the charge transient;

C is the total capacitance of capacitive element 21;

$V_{NOM}$ is the nominal voltage at the terminals of capacitive element 21;

$V_{MAX}$ is the maximum charge voltage at the terminals of capacitive element 21 during the initial time interval of the charge transient.

The inductance of inductive element 22 is given by the equation:

$$L = R_T \tau$$

where:

L is the inductance of inductive element 22;

$R_T$ is the total resistance equal to the sum of the internal resistance RB of battery 20 and the resistance RL of inductive element 22;

τ is the time constant of the series branch defined by battery 20 and inductive element 22, and ranges between ⅓ and ⅕ of the predetermined initial time interval of a discharge transient.

In general, the time constant of the series branch defined by battery 20 and inductive element 22 may be estimated as ¼ of the predetermined initial time interval of a discharge transient.

The duration of the initial time interval of a discharge transient is determined as a function of the time pattern of the current supply required of energy storage system 15 during the discharge transient, and as a function of a desired maximum current supply by battery 20 during the discharge transient. More specifically, the duration of the initial time interval of a discharge transient equals the time interval necessary for the current supply required of energy storage system 15 during the discharge transient to equal the desired maximum current supply by battery 20 during the discharge transient.

In a preferred embodiment, capacitive element 21 comprises at least one module of ultracapacitor elements, such as "Electric Double Layer Capacitors"; and an equalizing circuit (not shown in detail). The energy dissipating effect caused by self-discharge of capacitive element 21 being totally negligible (about 1 Wh/day), dissipation devices are not normally required, but may obviously be integrated easily in energy storage system 15.

During normal operation of energy storage system 15, discharge or charge transients are initially sustained by intervention of capacitive element 21; and, once the initial transient expires, the electrical energy involved is supplied and absorbed by battery 20.

Numerous comparative tests of operation of energy storage system 15 as described above have been conducted, the results of some of which are discussed briefly below.

Some of the tests were conducted using a FIAT® Punto® car with a four-in-line-cylinder, 1200 cc, petrol-fueled internal combustion engine. The car was first fitted with a standard 44 Ah capacity, 12 volt lead-acid battery, and subsequently with an appropriately sized energy storage system 15 of the type described above.

First, current and voltage at the standard battery terminals were measured, and hot and cold start-up absorption recorded. Next, current and voltage at terminals 19 of energy storage system 15 were measured, and hot and cold start-up absorption recorded.

Figure 3:
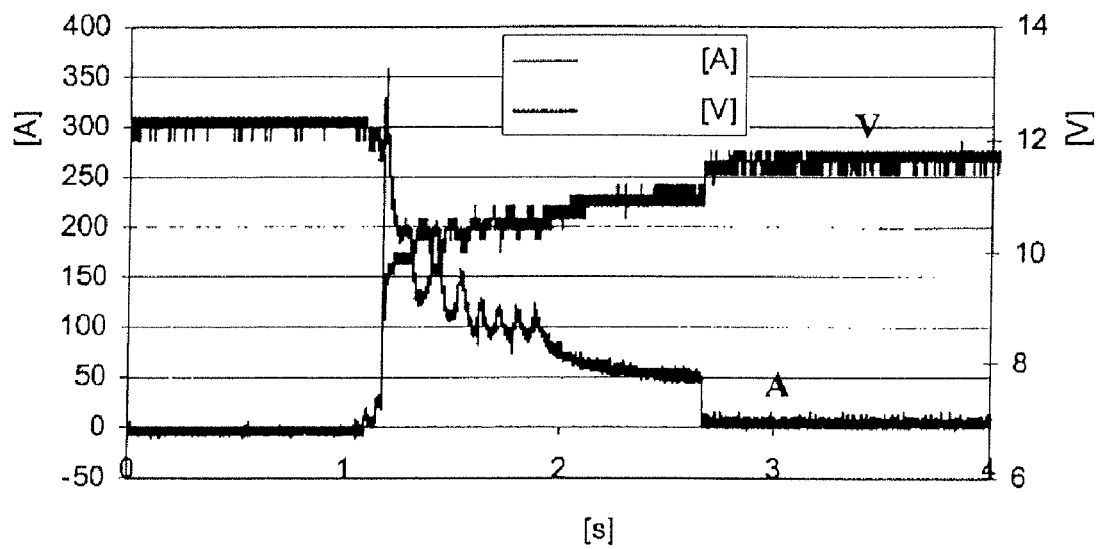
FIG. 3 shows a time graph of the voltage and current measured at the terminals of a standard car battery during hot start-up.

FIG. 3 shows a graph of the voltage V and current A measured at the standard battery terminals of the car at hot start-up. As can be seen, at start-up, two typical phases occur at separate times: a start-up transient phase, and a steady-state phase.

Figure 4:
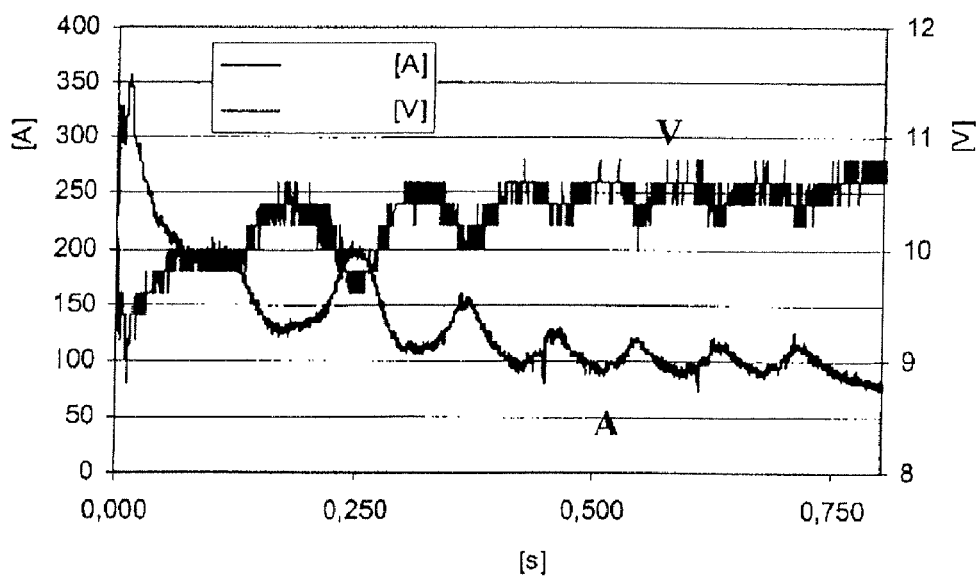
FIG. 4 shows a detail of FIG. 3.

FIG. 4 shows a detail of the FIG. 3 graph transient phase. With reference to FIG. 4, start-up of the internal combustion engine is completed in about 750 ms. By observing the voltage and current absorption patterns in FIG. 4, it is possible to determine the transient duration, which, in this case, is about 250 ms. The times characterizing start-up of internal combustion engine 2 are therefore: total start-up 750 ms, transient 250 ms, steady-state phase 500 ms.

The Tables below show the power and energy calculated for different phases on the basis of the FIG. 4 measurements.

TABLE 1 discharge transient 0-250 ms

|  | Current [A] | Voltage [V] | Power [W] | Energy [J] |
|---|---|---|---|---|
| Max | 357 | 11.8 | 3213 |  |
| Min | 19 | 8.8 | 224 |  |
| Med | 188 | 10.0 | 1856 |  |
| TOT |  |  |  | 465 |

TABLE 2 steady-state phase 250-750 ms

|  | Current [A] | Voltage [V] | Power [W] | Energy [J] |
|---|---|---|---|---|
| Max | 201 | 10.8 | 1970 |  |
| Min | 73 | 9.6 | 788 |  |
| Med | 112 | 10.4 | 1160 |  |
| TOT |  |  |  | 580 |

TABLE 3 total start-up 0-750 ms

|  | Current [A] | Voltage [V] | Power [W] | Energy [J] |
|---|---|---|---|---|
| Max | 357 | 11.8 | 3213 |  |
| Min | 19 | 8.8 | 224 |  |
| Med | 137 | 10.3 | 1392 |  |
| TOT |  |  |  | 1045 |

As shown in Table 1, the maximum current to which battery 20 is subjected at the transient phase corresponding to the first 250 ms of operation equals 357 A.

To make the comparison as significant as possible, the energy storage system 15 on the test car comprises a battery 20 identical to the standard battery, i.e. a 44 Ah, 12 volt lead-acid battery. The capacitive element 21 of energy storage system 15 on the test car comprises six series-connected ultracapacitor elements, such as "Electric Double Layer Capacitors", each of 2.5 volts, and can therefore also operate at the regenerative braking and recharge stages with reversible electric machine 8 operating as a generator at a voltage of roughly 14 volts.

As regards the rest of capacitive element 21, it was decided that capacitive element 21 should be capable of sustaining both the discharge transient corresponding to the first 250 ms, and complete start-up of the internal combustion engine lasting 750 ms. On the basis of these two operating requirements and the measurements shown in Tables 1 and 3, the characteristics of capacitive element 21 are:

TABLE 4

| capacitive element 21 | |
|---|---|
| Voltage of each element | 2.5 V |
| Capacitance of each element | 12.5 F |
| Number of elements/connection | 6/series |
| Maximum voltage | 15 V |
| Total capacitance | 75 F |
| Equalizing circuit/type | yes/active |
| Dissipation device | non |

As regards reductions in storage system capacity caused by self-discharging of capacitive element 21, a 44 Ah lead-acid battery 20 discharging from 12V to 9V (in 20 hours) produces roughly 590 Wh of energy. Since the energy dissipated by capacitive element 21 self-discharging is about 1.0 Wh/day, i.e. negligible with respect to the capacity of battery 20, no devices were provided to counteract self-discharge of capacitive element 21.

As shown in Table 2, at the roughly 500 ms steady-state phase, the electric loads draw an average current of roughly 110 A. The value of inductive element 22 must be such as to permit steady-state operation of battery 20 once the roughly 250 ms initial discharge transient sustained by capacitive element 21 expires. Assuming the system comprising battery 20 and inductive element 22 reaches the steady state after a time interval equal to roughly four time constants, and assuming a transient of 250 ms, the time constant sought equals roughly 62 ms (250/4).

Taking into account the roughly 16 mohm total resistance of the system comprising battery 20 and inductive element 22, and given the time constant, the value of inductive element 22 is 1.0 mH; in which case, battery 20 will supply a maximum current of 110 A regarding also inductive element 22. As shown in Table 1, the maximum current supplied by battery 20 in the standard setup, on the other hand, is roughly 360 A.

Table 5 below shows the characteristic values of inductive element 22:

TABLE 5

| inductive element 22 | |
|---|---|
| Inductance | 1.0 mH |
| Maximum discharge current | 110 A |
| Maximum charge current | 110 A |
| Circuit time constant | 60 ms |
| Core material | amorphous |

Figure 5:
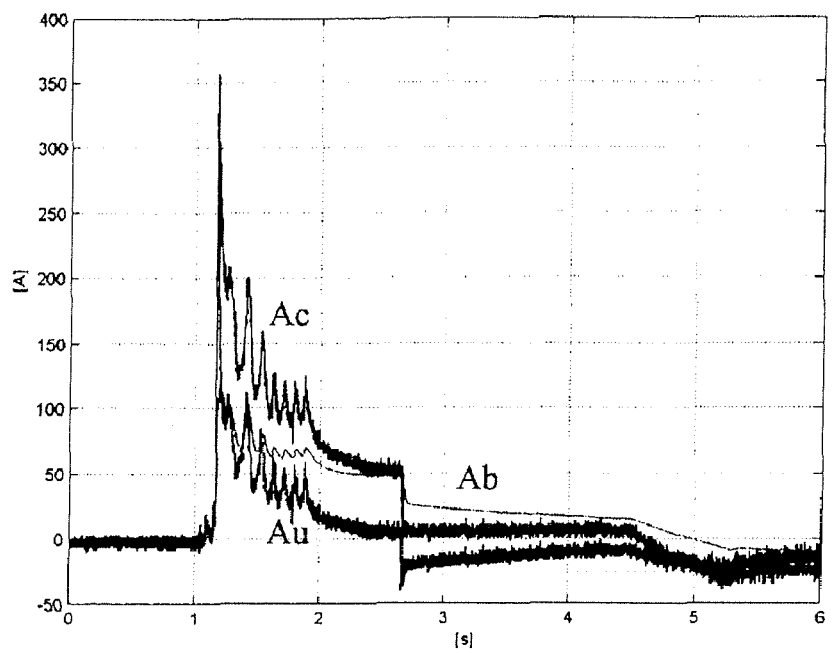
FIGS. 5 and 6 show time graphs of the current and voltage of an energy storage system in accordance with the present invention during hot start-up.
Figure 6:
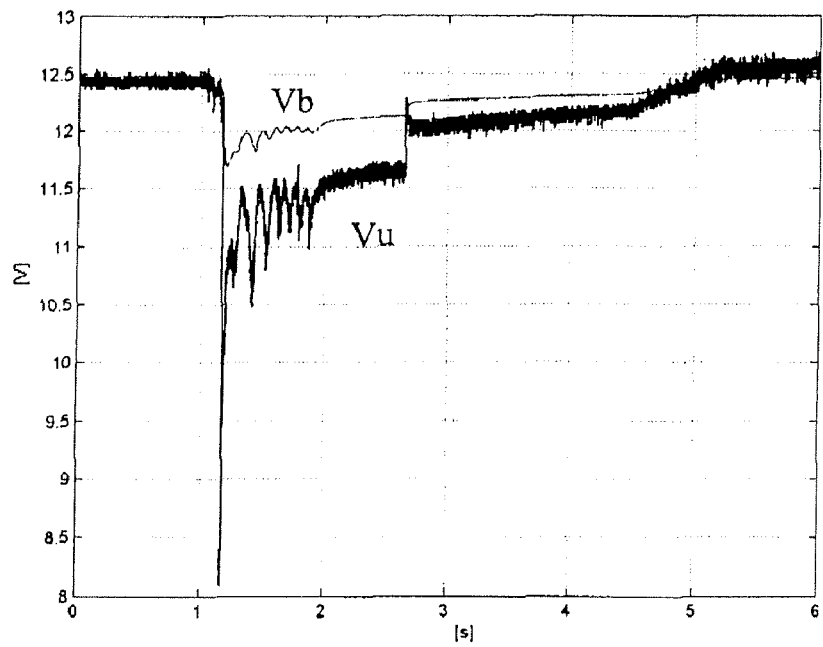

Performance of energy storage system 15, sized as described above, during the discharge transient when starting up internal combustion engine 2 is shown in FIGS. 5 and 6, which show the current and voltage pattern respectively. More specifically, FIG. 5 shows a graph of current absorption, and specifically of discharge current Ac, battery current Ab, and the current Au of capacitive element 21.

The maximum discharge current, equal to roughly 355 A, is initially sustained by capacitive element 21, which supplies 280 A; the battery current at this initial phase is roughly 75 A. The maximum battery current, which occurs after the first start-up transient, is roughly 120 A, and falls to 70 A once start-up is completed. Throughout the start-up phase, current supply by capacitive element 21 reflects the variations in current introduced by the load, while battery 20 contributes by supplying a steadier, decreasing current corresponding to the continuous part of the load.

Alongside the same discharge transient, if inductive element 22 were not provided, the maximum battery current would be roughly 250 A, and the maximum current of capacitive element 21 would be only 110 A; in which case, battery 20 would supply the maximum current in roughly 3 ms, as compared with 30 ms of the energy storage system 15 according to the present invention, which comprises inductive element 22 upstream from capacitive element 21. Moreover, without inductive element 22, battery 20 would be subjected to a transient of 2.2 times the current in one tenth of the time.

FIG. 6 shows a graph of battery voltage Vb and the voltage Vu at the terminals of capacitive element 21, and illustrates the initial contribution of capacitive element 21 in sustaining the discharge transient. Battery voltage Vb, in fact, undergoes a maximum variation of roughly 0.7 V (from 12.4V to 11.7V) as compared with 3.4 V in the standard battery setup. The voltage of battery 20 is also maintained steadier, at about 12 V, all the variations being sustained by capacitive element 21.

As shown clearly by the current graphs in FIG. 3 (standard battery) and FIG. 5 (energy storage system 15), the maximum current to which the standard battery is subjected at the transient phase corresponding to the first 250 ms of operation is 357 A; whereas, when battery 20 is incorporated in energy storage system 15, the maximum current to which battery 20 is subjected is roughly 110 A. This load-levelling effect produced by combining capacitive element 21 and inductive element 22 enables use of a battery 20 of high specific energy (Wh/kg) and, for a given amount of energy, use of a more lightweight battery 20. The increase in the specific energy level for a lead-acid battery 20 is 40% (more specifically, 25 Wh/kg for a power battery and 35 Wh/kg for an energy battery).

A further test was conducted simulating performance of energy storage system 15 alongside cold start-up of internal combustion engine 2. As is known, this is a particularly unfavourable condition for battery 20, on account of the reduction in capacity involved and the increased resistance of internal combustion engine 2 (friction and pumping). More specifically, actual start-up of internal combustion engine 2 is preceded by a non-firing crank phase of varying duration, which normally increases alongside a fall in temperature.

Figure 7:
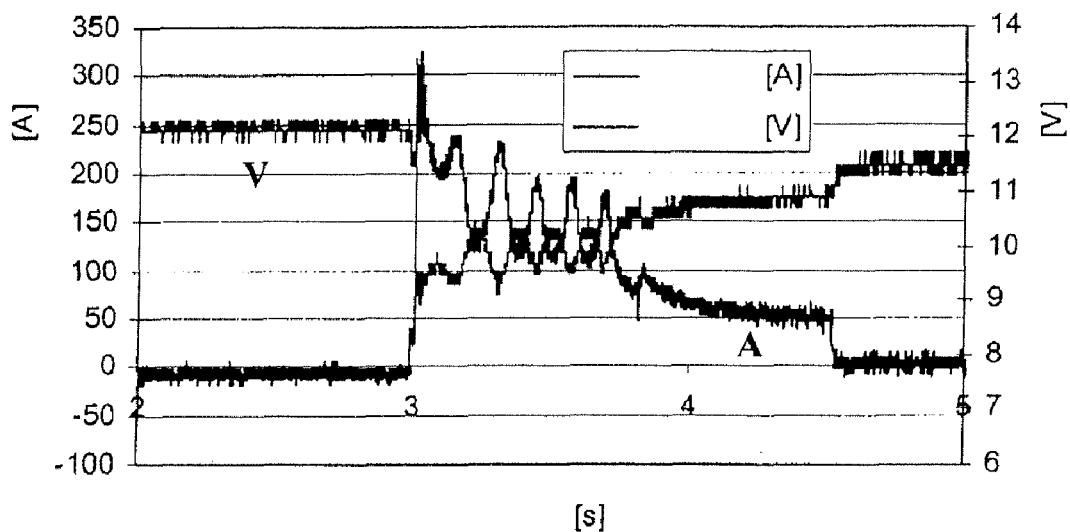
FIG. 7 shows a time graph of the voltage and current measured at the terminals of a standard car battery during cold start-up.

FIG. 7 shows the electric quantities measured at the terminals of the standard battery, i.e. without capacitive element 21 and inductive element 22, when cold starting the internal combustion engine (after being left idle overnight). In this case too, the start-up current measured indicates the discharge current requested of energy storage system 15.

Figure 8:
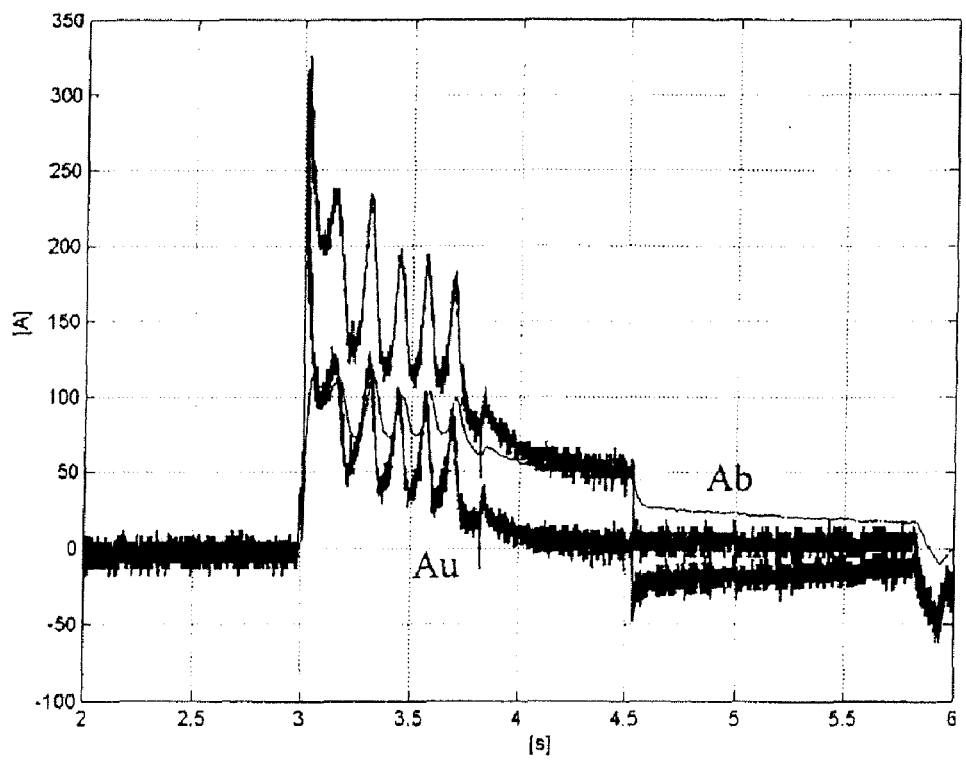
FIGS. 8 and 9 show time graphs of the current and voltage of an energy storage system in accordance with the present invention during cold start-up.
Figure 9:
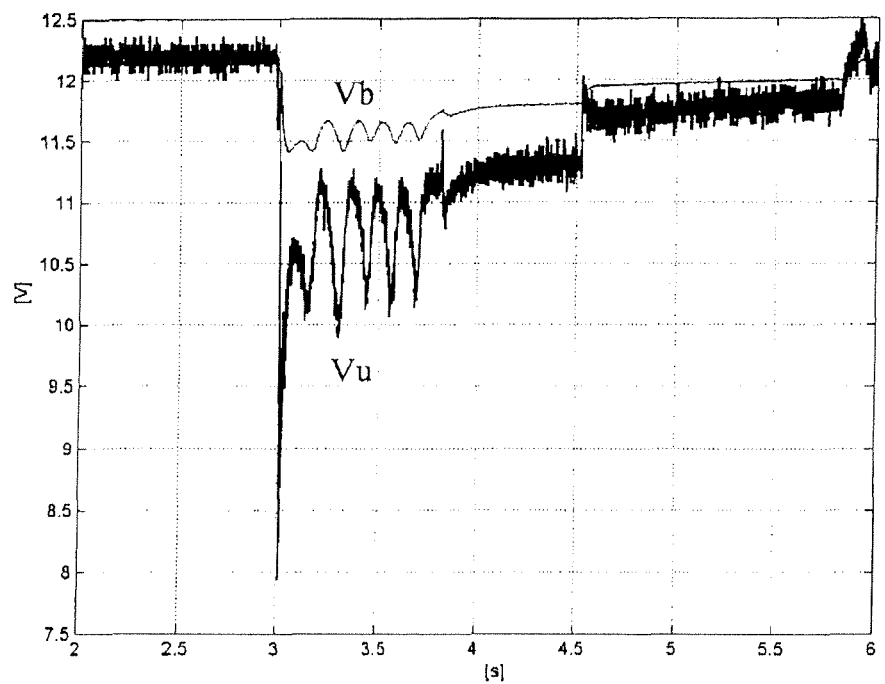

FIGS. 8 and 9 show voltage and current performance graphs of energy storage system 15 when cold starting the internal combustion engine (after being left idle overnight). FIG. 8 shows current performance. More specifically, energy storage system 15 responds to the initial maximum-current transient, of about 340 A, by supplying 240 A, while the maximum battery current Ab at this phase is only about 120 A.

When cold starting a standard battery, mean battery current is about 160 A with maximum peaks ranging between 230 and 180 A and a peak-peak amplitude of 80 A. In energy storage system 15 comprising capacitive element 21 and inductive element 22, on the other hand, peak battery current values range between roughly 120 and 100 A with 30-40 A amplitude.

The voltage performance illustrated in the FIG. 9 graph also shows how battery 20 combined with capacitive element 21 and inductive element 22 is subjected to less stress than standard battery 20 alone. As shown in FIG. 9, battery voltage Vb ranges between 11.4 and 11.8 V, whereas the voltage of the standard battery alone reaches an initial minimum of 8.8 V, and increases to no more than 10.5 V by the end of the operation.

The FIG. 2 scheme of power train 1 provides for recharging energy storage system 15 during normal operation of the vehicle, in the same way as a normal on-vehicle alternator, as well as for recovering part of the energy made available by the vehicle when braking and/or decelerating. In these operating conditions, the mechanical energy available at the reversible electric machine shaft is converted to electrical energy supplied to the storage system. This generating phase provides for sustaining on-vehicle electric system devices and loads, and for maintaining an adequate charge of energy storage system 15.

Figure 10:
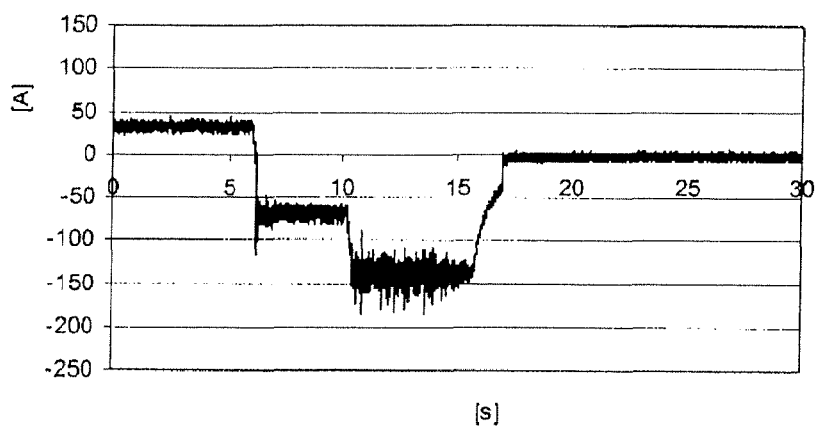
FIG. 10 shows a time graph of the current measured at the terminals of a standard car battery during regenerative braking.

Further electric quantities were measured during deceleration and braking of a PIAGGIO® Porter® Elettrico vehicle. FIG. 10 shows the recharge current measured when decelerating and during regenerative braking of the above vehicle, in particular from 35 km/h to zero, and with a mean deceleration of 0.80 m/s2 (equivalent to normal driving in city traffic). Both phases are performed at constant currents of roughly 70 A and 150 A respectively. It should be pointed out that, in sizing inductive element 22, transient current overloads in excess of 110 A and to a maximum of 150 A were taken into account. Performance of energy storage system 15 when decelerating and braking the vehicle was evaluated with reference to these current measurement patterns.

Figure 11:
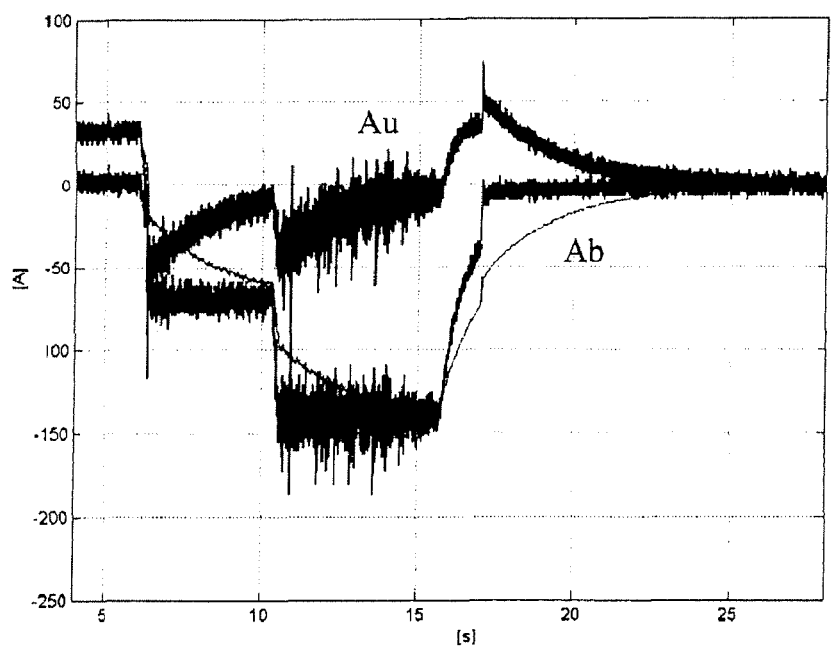
FIGS. 11 and 12 show time graphs of the current and voltage of an energy storage system in accordance with the present invention during regenerative braking.
Figure 12:
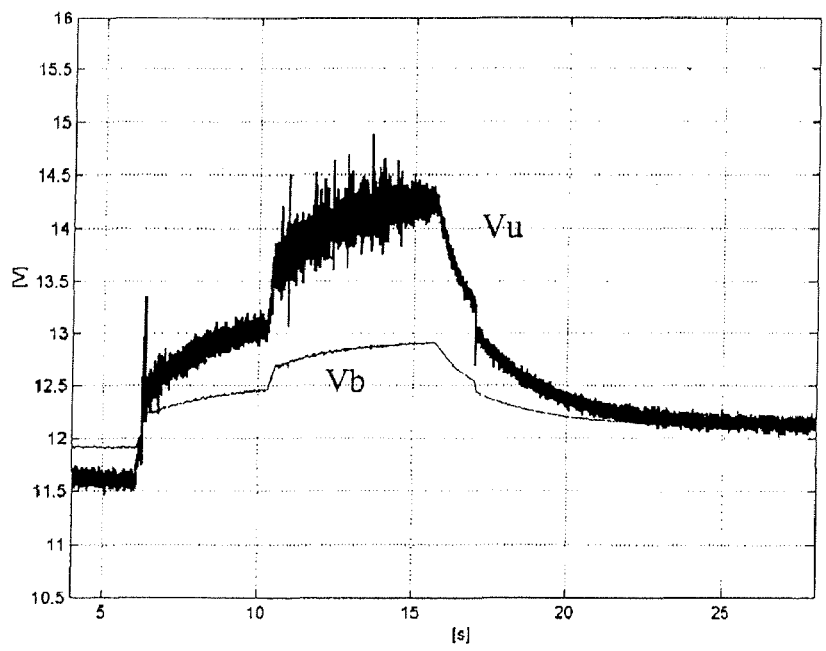

FIG. 11 shows a current graph of energy storage system 15 when decelerating and during regenerative braking of the PIAGGIO® Porter® Elettrico vehicle; battery current Ab only reaches the maximum generated current value, in a rising pattern, at the end of the two operations, by which time current Au of capacitive element 21 has dropped to zero. Moreover, any variation in the generated current is in the current of capacitive element 21, whereas the battery current remains steady. FIG. 12 shows battery voltage Vb and voltage Vu of capacitive element 21 during the charge transient. Throughout the regeneration phase, battery voltage is maintained between 12 and 13 V, whereas capacitive element 21 reaches the maximum generated voltage of 14.3 V at the end of the operation. Any variation in the generated voltage is only in the voltage of capacitive element 21.

The sizing proposed was developed for the application described herein purely by way of example. It is understood, therefore, that the system components may be sized otherwise than as described above, alongside variations in the application for which the system is designed, while still conforming with the operating principles described. Which variations are obviously within the scope of anyone skilled in the art.

As will be clear from the above description, in energy storage system 15, battery 20 and capacitive element 21 operate differentially and in complementary manner to enhance the efficiency and reliability of energy storage system 15 as a whole; which differential, complementary operation is achieved by virtue of inductive element 22 upstream from capacitive element 21. The power peaks produced by discharge or charge transients, in fact, are mainly sustained by capacitive element 21, regardless of its own charge state and/or the charge state of battery 20. As such, energy storage system 15 makes maximum useful power available, even in the event of a reduction in performance of battery 20 caused by ageing and/or a partial charge state.

More specifically, differential, complementary operation of battery 20 and capacitive element 21 during transients increases the working life of battery 20, and greatly reduces the loss in performance of battery 20, in terms of energy density, typical of all types of batteries subjected to high-power operation and frequent charge and discharge peaks. Moreover, the power peaks supplied and absorbed by battery 20 during transients are lower, thanks to the intervention of capacitive element 21, thus reducing stress and prolonging the working life of battery 20.

In other words, combining battery 20, capacitive element 21, and inductive element 22 provides for highly effective energy conversion during charge and discharge transients, and greatly reduces the peak current absorbed or supplied by battery 20, thus reducing Joule-effect losses of battery 20 and increasing the capacity of battery 20 for a given stored or extracted charge.

It is important to note that the differential, complementary response of battery 20 and capacitive element 21 during charge or discharge transients provides for solving the problems encountered when cold starting internal combustion engine 2 and caused by reduced capacity of battery 20. That is, the start-up transient is substantially sustained by capacitive element 21, which has a minimum increase in internal resistance alongside a reduction in temperature, thus also enhancing the reliability of energy storage system 15 in critical cold operating conditions.

Another important point to note is that the energy storage system 15 proposed has no electronic interface components for regulating energy flow, and is therefore cheap to produce. Energy storage system 15, in fact, comprises exclusively passive, and therefore intrinsically more reliable, electric components.

Finally, given the load levelling effect of capacitive element 21 and inductive element 22, battery 20 can be sized to high specific energy characteristics, and so used over a wider state-of-charge (SOC) range. For a given amount of available energy, therefore, a smaller, cheaper battery 20 may be used.

Generally speaking, combining any type of battery 20 with ultracapacitors doubles the specific energy level Wh/kg and peak power density W/kg as compared with an energy storage system 15 of equal weight but comprising only battery 20. More specifically, lead-acid batteries combined with ultracapacitors show the greatest increase in working life in operating conditions involving frequent charge/discharge cycles.

It is important to note that energy storage system 15 may be housed in a casing 18 of the same external shape and size as a standard battery, and may therefore be substituted for a conventional battery, even in the form of an after-market kit.

Energy storage system 15 is described above with reference to vehicles in the "Mild Hybrid Vehicle" class, but, given its many advantages, may obviously also be applied advantageously to other types of vehicles.

For example, energy storage system 15 may be used to advantage on machinery and equipment operating with a high on-off frequency and comprising important continuously-operating auxiliary functions.

The invention claimed is:

1. A power train for a hybrid vehicle comprising:
   an internal combustion engine having a drive shaft;
   a transmission having an input shaft connected mechanically the drive shaft of the internal combustion engine and an output shaft connected mechanically to drive wheels;
   an alternating-current reversible electric machine which may operate as both an electric motor and an electric generator and can exchange mechanical power with the drive shaft of the internal combustion engine and with the drive wheels;
   a direct-current energy storage system;

a two-way electronic converter connecting electrically the reversible electric machine to the energy storage system and allowing reversible electric machine to operate in generator mode and motor mode;

wherein the direct-current energy storage system comprises: a battery, a capacitive element connected in parallel to terminals of the battery, and an inductive element connected in series to the battery, between the battery and the capacitive element; and wherein to effectively regulate power/energy flow between the battery and the capacitive element during charge or discharge transients of the battery: the quotient of the capacity of the battery measured in Ampere-hour Ah divided by the capacitance of the capacitive element measured in Farad F is less than 1; and quotient of the capacity of the battery measured in Ah divided by the inductance of the inductive element measured in micro-Henry μH is less than 1.

2. The power train as claimed in claim 1, wherein the quotient of the capacity of the battery measured in Ah divided by the inductance of the inductive element measured in μH is below 0.5.

3. The power train as claimed in claim 1, wherein the quotient of the capacity of the battery measured in Ah divided by the inductance of the inductive element measured in μH is below 0.25.

4. The power train as claimed in claim 1, wherein the capacitance of the capacitive element stores enough energy to power electric user devices of the vehicle comprising electric devices and the reversible electric machine operating as a motor autonomously during a predetermined initial time interval of a discharge transient of the battery.

5. The power train as claimed in claim 4, wherein the capacitive element is sized to meet the following requirements:
- the maximum current withstandable by the capacitive element is greater than the maximum current supply required of the capacitive element during the initial time interval of the discharge transient of the battery;
- the maximum voltage withstandable by the capacitive element is greater than the maximum charge voltage;
- the energy that can be supplied by the capacitive element is greater than the energy required by the electric user devices during the initial time interval of the discharge transient of the battery;
- the voltage at the terminals of the capacitive element at the end of the initial time interval of the discharge transient of the battery is greater than the minimum supply voltage of the electric user devices.

6. The power train as claimed in claim 5, wherein the capacitive element is sized according to the equation:

$$E_{TRANS} = \frac{1}{2} \cdot C \cdot (V_{NOM}^2 - V_{MIN}^2)$$

where:
$E_{TRANS}$ is an energy required by the electric user devices during the initial time interval of the discharge transient of the battery;
C is the total capacitance of the capacitive element;
$V_{NOM}$ is the nominal voltage at the terminals of the capacitive element;
$V_{MIN}$ is the minimum supply voltage of the electric user devices.

7. The power train as claimed in claim 1, wherein the capacitive element absorbs energy supplied by the electric user devices of the vehicle during a predetermined initial time interval of a charge transient of the battery.

8. The power train as claimed in claim 7, wherein the capacitive element is sized according to the equation:

$$E_{TRANS} = \frac{1}{2} \cdot C \cdot (V_{MAX}^2 - V_{NOM}^2)$$

where:
$E_{TRANS}$ is an energy supplied by the electric user devices during the predetermined initial time interval of the charge transient of the battery;
C is the total capacitance of the capacitive element;
$V_{NOM}$ is the nominal voltage at the terminals of the capacitive element;
$V_{MAX}$ is the maximum charge voltage at the terminals of the capacitive element during the initial time interval of the charge transient of the battery.

9. The power train as claimed in claim 1, wherein the inductance of the inductive element is given by the equation:

$$L = R_T \tau$$

where:
L is the inductance of the inductive element;
$R_T$ is the total resistance equal to the sum of the internal resistance $R_B$ of the battery and the resistance $R_L$ of the inductive element;
τ is the time constant of the series branch defined by the battery and the inductive element.

10. The power train as claimed in claim 9, wherein the time constant of the series branch defined by the battery and the inductive element equals ¼ of the predetermined initial time interval of a discharge transient of the battery.

11. The power train as claimed in claim 1, wherein the capacitive element comprises a module of ultracapacitor elements.

12. The power train as claimed in claim 11, wherein the ultracapacitors are of the "Electric Double Layer Capacitor" type.

13. The power train as claimed in claim 1, wherein the energy storage system comprises a casing, which houses the battery, the inductive element, and the capacitive element, and comprises terminals for connection to an electric system of the vehicle.

* * * * *

UNITED STATES PATENT AND TRADEMARK OFFICE
CERTIFICATE OF CORRECTION

PATENT NO. : 7,745,953 B2  
APPLICATION NO. : 11/380043  
DATED : June 29, 2010  
INVENTOR(S) : Angelo Puccetti et al.

Page 1 of 1

It is certified that error appears in the above-identified patent and that said Letters Patent is hereby corrected as shown below:

Title Page, Item (73) Assignees: delete "L'Anbiente-ENEA" and insert --L'Ambiente-ENEA--

Signed and Sealed this  
Thirtieth Day of October, 2012

David J. Kappos  
*Director of the United States Patent and Trademark Office*